Nov. 9, 1965   H. H. SCHMIEL   3,216,446
SPOOL VALVE ASSEMBLY WITH DUAL CHECK VALVE ASSEMBLY
Filed Feb. 5, 1963
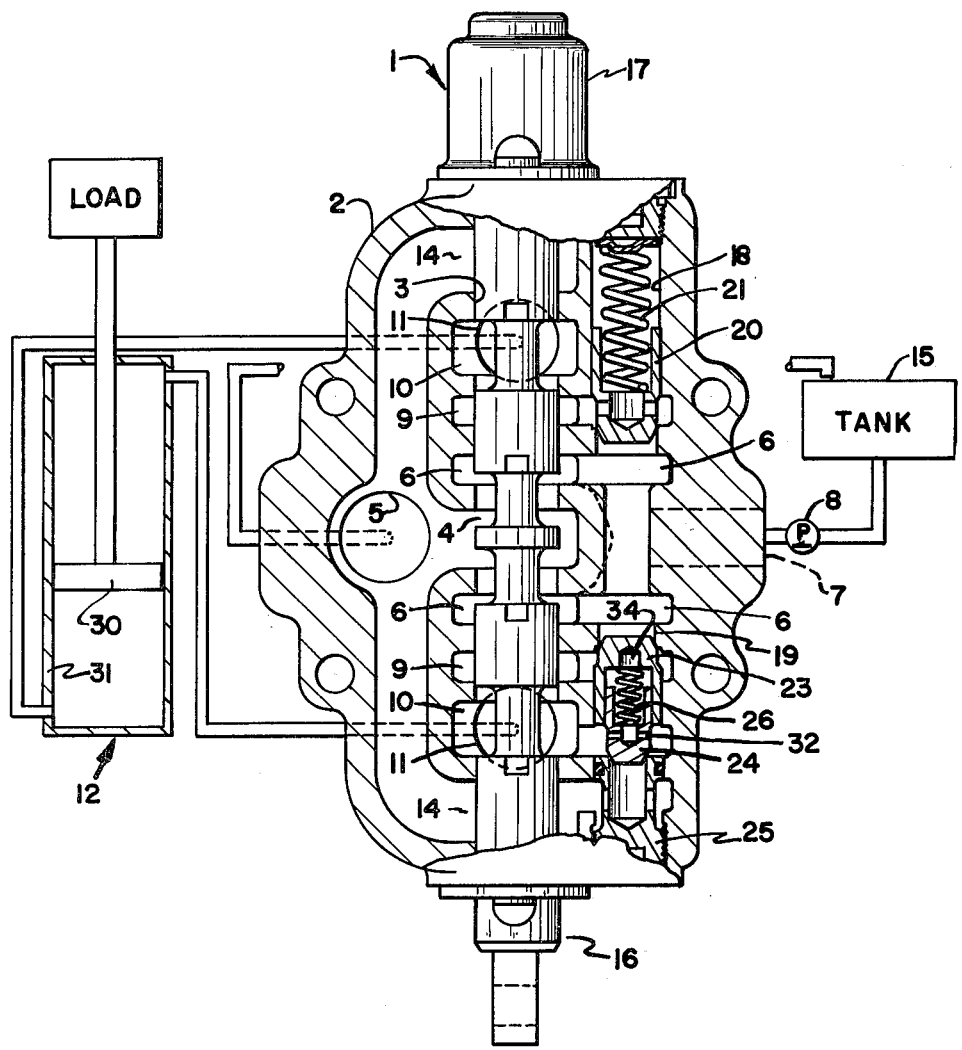
INVENTOR.
HERBERT H. SCHMIEL
BY
Oberlin, Maky & Donnelly
ATTORNEYS ically patented on Nov. 9, 1965

United States Patent Office 3,216,446
Patented Nov. 9, 1965

3,216,446
SPOOL VALVE ASSEMBLY WITH DUAL CHECK VALVE ASSEMBLY
Herbert H. Schmiel, Willoughby, Ohio, assignor to Parker-Hannifin Corporation, Cleveland, Ohio, a corporation of Ohio
Filed Feb. 5, 1963, Ser. No. 256,432
6 Claims. (Cl. 137—596)

The present invention relates generally as indicated to a spool valve assembly and more particularly to a spool valve assembly which has associated therewith a novel check valve arrangement to prevent back flow of fluid from a motor port to the pressure inlet port of the spool valve housing and to permit flow of fluid from the tank port to such motor port. In this way load dropping and cavitation of a fluid motor controlled by the spool valve assembly is prevented.

A principal object of the present invention is to provide a simplified, compact, and efficient form of valve assembly in which the aforesaid check valve arrangement includes a pair of oppositely disposed check valve members telescoped coaxially one within the other in a passage located alongside the bore in which the spool valve element is axially reciprocable.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawing:

The single figure is a cross-section view of a spool valve assembly in accordance with the present invention, such section having been taken in a plane passing through the axes of the side by side spool valve and check valve bores.

Referring now more particularly to the drawing, the spool valve assembly 1 is by way of example shown as being of the four-way open-center type, the unitary housing 2 of which has a spool bore 3 intersected axially therealong by a central bypass passage 4 which leads to a tank port 5; a pair of pressure inlet passages 6 leading from a pressure inlet port 7 adapted to be communicated with the pressure delivery side of a pump 8; a pair of pressure feed passages 9; a pair of motor passages 10 leading to motor ports 11 adapted for connection with a fluid motor 12; and a pair of tank passages 14 leading to the tank port 5 through which fluid displaced from either end of the motor 12 is returned to the tank or reservoir 15.

Reciprocable in the spool bore 3 in a valve spool 16 which has the usual alternate lands and grooves to control operation of the double-acting fluid motor 12 shown in the drawing. The housing 2 is provided with suitable packing rings (not shown) to seal the spool ends and within the cap 17 is the usual spring-centering mechanism (not shown) operative to return the spool to its neutral position as shown in the drawing from either of its operating positions.

Alongside the spool bore 3 the housing 2 has coaxial passages 18 and 19 of which passage 18 is intersected by the inlet passage 6 and the upper pressure feed passage 9 and has therein a check valve 20 seated by spring 21 to prevent back flow of fluid from the upper pressure feed passage 9 into the inlet passage 6.

The lower passage 19 is intersected by inlet passage 6, lower pressure feed passage 9, lower motor passage 10, and lower tank passage 14 and has dual check valves 23–24 of which check valve 23 prevents back flow of fluid from the lower pressure feed passage 9 into the inlet passage 6. The other check valve 24 is oppositely disposed with respect to said check valve 23 and is telescoped within the latter to permit flow of fluid from the lower tank passage 14 to the lower motor passage 10. The seats for check valves 20 and 23 are integrally formed in housing 2 whereas the seat for check valve 24 is formed at the end of a tubular plug 25 screwed into housing 2. A single spring 26 compressed between check valves 23 and 24 urges them toward their seated positions.

It can be seen that when the spool 16 is in the neutral (and hold) position as shown in the drawing, the piston 30 is locked in the cylinder 31 against movement in either direction and the fluid delivered by the pump 8 is freely returned to the tank 15 via the inlet passages 6 which are open to the central bypass passage 4, and tank port 5. When the spool 16 is shifted downward from its neutral position, the aforesaid bypass passage 4 is closed, and fluid under pressure will flow from the upper inlet passage 6 past the check valve 20 into the upper pressure feed passage 9 into the upper motor passage 10, whereby the piston and its load will be raised. As evident, when the spool 16 is thus shifted downward, the check valve 20 will prevent load dropping or back flow of fluid from the upper motor passage 10 and upper pressure feed passage 9 into the inlet passage 6 in the event that the system pressure is lower due to, for example, operation of other spool valves and cylinders. The fluid displaced from the cylinder 31 is returned to the tank via the lower motor passage 10 and the lower tank passage 14.

When it is desired to move the piston 30 in the opposite direction, that is, downward, the spool 16 is moved upward from neutral position, the central bypass passage 4 again being closed and the lower feed passage 9 being placed in communication with the lower motor passage 10, whereby fluid under pressure flown from the inlet passage 6 past the check valve 23 into the lower pressure feed passage 9 for causing the piston 30 to be moved downward in cylinder 31. At the same time, fluid displaced from the lower end of the cylinder 31 is conducted to the tank 15 by way of the upper motor passage 10 which is now in communication with the upper tank passage 14.

However, in the event that the downward load on the piston 30 is extremely great or that the capacity of pump 8 is insufficient to maintain pressure in the upper end of the cylinder 31, cavitation therein is prevented by opening of the check valve 24 to permit makeup fluid to flow from the lower tank passage 14 into the lower motor passage 10 so that the upper end of the cylinder 31 is kept filled with fluid under these operating conditions.

It is to be noted that the check valve 24 has passages 32 therein communicating the chamber 34 with the lower motor passage 10, thereby preventing trapping of liquid between the check valves 23 and 24. When the foregoing conditions of operation are encountered both check valves 23 and 24 will be seated by spring 26 until the back pressure in lower tank passage 14 exceeds the pressure in the lower motor passage 10 by an amount sufficient to compress spring 26 and move check valve 24 away from its seat. The check valve 23, of course, functions to prevent back flow of fluid from lower speed passage 9 into inlet passage 6.

Although in the installation here shown the load always acts downwardly on piston 30 there are numerous instances in which a load opposes piston movement in both directions (as in moving the slide of a machine tool or in opening and closing the dies of an injection molding machine) or changes from positive to negative (as in actuating an overshot loader boom through a vertical position). Furthermore, the dual check valves 23 and 24 may, by appropriate modification of bore 18, be substituted for check valve 20 when the installation is such that both ends of the fluid motor 12 are subject to cavitation with consequent need for makeup fluid.

Other modes of applying the principle of the invention may be employed, change being made as regards the details described, provided the features stated in any of the following claims, or the equivalent of such, be employed.

I therefore particularly point out and distinctly claim as my invention:

1. A valve assembly having a feed passage for connection with a fluid pressure source, a motor passage for connection with a fluid motor, and a return passage for connection with a fluid reservoir, and a valve member movable alternately to communicate said motor passage with said feed passage and said return passage; said assembly having a coaxial first and second check valve means telescoped one within the other, and a spring compressed between said check valve means biasing them against coaxial seats in said feed passage and in a portion of said return passage leading to said motor passage, said first check valve means being operative to move away from its seat by fluid pressure in said feed passage exceeding that in said motor passage to permit fluid to flow from said feed passage to said motor passage when said feed and motor passages are in fluid communication through said valve member, and said second check valve means being operative to move away from its seat by fluid pressure in said return passage exceeding that in said motor passage to permit fluid to flow from said return passage to said motor passage.

2. A valve assembly comprising a housing having an inlet port for connection with a fluid pressure source, a motor port for connection with a fluid motor, a return port for connection with a fluid reservoir, and a connecting passage from said inlet port to said motor port and said return port; a valve member movable in said housing alternately to communicate said motor port with said inlet port and said return port; and a pair of check valve means in said connecting passage, one of said check valve means being adapted to open for flow of fluid from said inlet port to said motor port only when in communication with each other through said valve member in response to fluid pressure in said inlet port exceeding that in said motor port, and the other of said check valve means being adapted to open for flow of fluid from said return port to said motor port only in response to fluid pressure in said return port exceeding that in said motor port.

3. A valve assembly comprising a housing having an inlet port for connection with a fluid pressure source, a motor port for connection with a fluid motor, and a return port for connection with a fluid reservoir; a valve member movable in said housing alternately to communicate said motor port with said inlet port and said return port; a pair of check valve means in said housing, one of said check valve means being adapted to open for flow of fluid from said inlet port to said motor port when in communication with each other through said valve member in response to fluid pressure in said inlet port exceeding that in said motor port, and the other of said check valve means being adapted to open for flow of fluid from said return port to said motor port in response to fluid pressure in said return port exceeding that in said motor port; and a single spring compressed between said opposed check valve means for urging them to positions closing said communication upon reversal of the fluid pressure differentials as aforesaid.

4. The assembly of claim 3 wherein said check valve means are coaxially telescoped one within the other for relative axial movements in said housing to such opened conditions in response to fluid pressure differentials as aforesaid.

5. A spool valve assembly for controlling actuation of a double-acting fluid motor comprising a housing having an inlet chamber for connection with a fluid pressure source; a return chamber for connection with a fluid reservoir; and a bore intersected axially therealong and starting at the middle by a first bypass passage portion leading to said return chamber, by a pair of bypass passage portions straddling said first bypass passage portion and leading to said inlet chamber, by a pair of fluid pressure feed passages straddling said pair of bypass passage portions and leading to said inlet chamber, a pair of motor passages straddling said pair of feed passages for connection with the ports of a double-acting fluid motor, and a pair of return passages straddling said motor passages and leading to said return chamber; a valve spool axially reciprocable in such bore from a neutral position whereat fluid communication is blocked between said motor passages and said feed passages and between said motor passages and said return passages and said inlet chamber is in fluid communication with said return chamber via said pair of bypass passage portions and said first bypass passage portion to two operating positions whereat the respective motor passages are alternately in fluid communication with an associated feed passage and an associated return passage and fluid communication between said pair of bypass passage portions and said first bypass passage portion is blocked thereby; said housing having a connecting passage directly communicating said inlet chamber with one return passage and the adjacent motor passage; and a check valve means in said connecting passage operative to permit flow of fluid from said one return passage to the adjacent motor passage only when fluid pressure in said one return passage exceeds that in said adjacent motor passage.

6. The spool valve assembly of claim 5 wherein there is another check valve means disposed in said connecting passage operative to prevent flow of fluid which enters the associated motor passage from said one return passage when fluid pressure in said one return passage exceeds that in said adjacent motor passage as aforesaid from backflowing into said inlet chamber.

References Cited by the Examiner

UNITED STATES PATENTS

| 2,708,909 | 5/55 | Curlett | 137—625.25 X |
| 2,711,717 | 6/55 | Stacey | 137—596.12 |
| 2,980,135 | 4/61 | Tennis | 137—596.12 |
| 3,134,402 | 5/64 | Tennis | 137—596 |

FOREIGN PATENTS 851,023  10/50  Great Britain.

M. CARY NELSON, *Primary Examiner.*